United States Patent Office 3,476,724
Patented Nov. 4, 1969

3,476,724
POLYMERIZATION PROCESS AND CATALYST
John P. Hogan and Alonzo G. Kitchen, Bartlesville, Okla., assignors to Phillips Petroleum Company, a corporation of Delaware
No Drawing. Continuation-in-part of application Ser. No. 425,929, Jan. 15, 1965. This application July 13, 1967, Ser. No. 653,022
Int. Cl. C08f 1/38, 1/34; B01j 11/84
U.S. Cl. 260—88.2                                    11 Claims

ABSTRACT OF THE DISCLOSURE

Olefins are polymerized to solid polymers in the presence of a catalyst comprising chromium oxide and at least one member of the group consisting of silica, alumina, zirconia and thoria, at least part of the chromium in the catalyst being hexavalent at the initial contacting with hydrocarbon, to which catalyst is added two compounds, one having the formula $ZnR_2$ and the second being a borane of 2 to 10 boron atoms or a compound having the formula $BR_3$.

Cross-reference to related applications

This is a continuation-in-part of application Ser. No. 425,929, filed Jan. 15, 1965, now abandoned.

Background of the invention

This invention relates to the catalytic polymerization of olefins to form solid thermoplastic polymers. In one aspect, it relates to an improved catalyst for use in such a process.

Prior to the present invention, it was known to synthesize normally solid thermoplastic polymers by polymerizing ethylene and/or other 1-olefins in the presence of a catalyst comprising, as its sole essential effective catalytic ingredients, chromium oxide and at least one member of the group consisting of silica, alumina, zirconia and thoria, at least part of the chromium in the catalyst being hexavalent at the initial contacting with hydrocarbon. The catalytic polymerization is usually carried out at a temperature within the range 100 to 500° F. and more frequently within the range 150 to 375° F. The polymers obtained are useful for the formation of molded articles, filaments, and films. Details of this process are described in U.S. Patent 2,825,721 (1958).

Summary of the invention

We have discovered that a catalyst and process of the type referred to can be improved by the addition of two compounds, one having the formula $ZnR_2$ and the second being a borane of 2 to 10 boron atoms or a compound having the formula $BR_3$, wherein R in each compound is individually selected from the group consisting of hydrogen, alkyl, cycloalkyl and aryl including combinations of these such as alkaryl, aralkyl, alkylcycloalkyl, etc., at least one R in each compound being a hydrocarbon radical, the total number of carbon atoms in each compound not exceeding 20.

An object of this invention is to provide an improved polymerization catalyst. Another object is to provide an improved polymerization process. An additional object is to increase yields of polymers. A further object is to increase the productivity of a polymerization catalyst. Other objects and advantages will become apparent to those skilled in the art upon consideration of this disclosure.

Broadly, then, the invention provides a process which comprises polymerizing ethylene to normally solid polymer, in the presence of a catalyst which forms on mixing (1) chromium oxide, having at least part of the chromium in the hexavalent state at the initial contacting of monomer therewith, and at least one oxide selected from the group consisting of silica, alumina, zirconia, and thoria (2) a compound of the formula $ZnR_2$ where R is selected from the group consisting of hydrogen, alkyl, cycloalkyl, and aryl radicals having up to 20 carbon atoms, at least one R being a hydrocarbon radical, and (3) a compound selected from the group consisting of boranes of 2 to 10 boron atoms and compounds of the formula $BR_3$ where R is as defined above. We prefer to supply the $ZnR_2$ and the boron additive continuously during the course of the reaction. Other methods include adding the total amount at the beginning of the reaction and incremental addition. Preferably not more than one quarter of the additives is added at the beginning of the reaction. The amount of $ZnR_2$ compound employed is in the range of 0.1 to 15 weight percent based on the weight of component (1) and the amount of boron compound is in the range of 0.05 to 5 weight percent based on the weight of component (1). Good results are obtained where the amount of $ZnR_2$ compound is in the range of 2 to 15 weight percent based on the weight of component (1) and the amount of boron compound is in the range of 0.5 to 5 weight percent based upon the weight of component (1).

Description of the preferred embodiments

A particular advantage of our invention is the production of polymers in high yield having high shear response. The use of organozinc or organoboron compounds alone produces some improvement in yield and shear response when used with the chromium oxide catalysts but the use of the two catalyst adjuvants together gives the same improvement in shear response and also results in a greater than additive increase in polymer yield.

One of the more critical properties in 1-olefin polymers is the shear sensitivity of the polymer. "Shear sensitivity" means the sensitivity of shear rate to changes in shear stress applied to the molten polymer. This property also is referred to as "shear response"—the response of shear rate to changes in shear stress.

Although it is possible to vary at will the melt index of polyolefins, it is not always a simple matter to control the shear response. Many of the factors which influence this property are still unknown, and consequently it can vary significantly through chance factors.

Shear response of a polymer is a function of molecular weight distribution—the narrower the distribution, the less change in shear rate with change in applied shear stress. Conversely, the wider the molecular weight distribution, the greater is the shear response, which is, in turn, reflected in the processability of that polymer for certain types of applications. Fabrication of polyethylene bottles is an example of an application where high shear response polymer is particularly advantageous. On the other hand, low shear response polyethylene is desirable in applications involving injection molding of items which might otherwise have a tendency to warp and also in vacuum forming operations where it minimizes sagging of the polymer during processing of same. Some fiber and paper coating applications also find low shear response polymers advantageous.

The molecular weight distribution of a polymer is generally expressed by the ratio of the weight average molecular weight of the number average molecular weight $(M_w/M_n)$. However, it has been found that the molecular weight distribution as expressed by $M_w/M_n$ is a function of the ratio of high load melt index to regular melt index (HLMI/MI). The determination of polymer melt index (ASTM D1238) is convenient, and therefore it is similarly convenient to measure the molecular weight distribution by means of the melt index ratio and to use this value in predicting the polymer's shear response.

As stated earlier, the catalysts to which this invention is applicable are those chromium oxide-containing catalysts whose preparation is described in U.S. Patent 2,825,721. It is particularly applicable to catalysts comprising microspheroidal silica or silica-alumina over which there has been distributed about 1 to 5 weight percent of an oxide of chromium at least part of which is in hexavalent form at the initial contacting of monomer therewith. Catalyst activation can be effected by treatment with dry air for 0.1 to 50 hours, preferably 3 to 10 hours, at temperatures of 750 to 2000° F., preferably 900 to 1100° F.

Zinc compounds which can be used in accordance with this invention are dimethylzinc, diethylzinc, di-n-propylzinc, diisopropylzinc, di-n-butylzinc, diisobutylzinc, di-n-amylzinc, the diisoamylzincs, di-n-hexylzinc, di-n-octylzinc, and di-n-dodecylzinc. Also, useful in accordance with this invention are dicyclopentylzinc, dicyclohexylzinc, dimethylcyclopentylzinc, dimethylcyclohexylzinc, diphenylzinc, the ditolylzincs, the dixylylzincs, di(2-hexyltetradecyl)zinc, di(4-cyclohexyloctyl)zinc, di(2-butylcyclohexyl)zinc, di(2,4,8-trimethylhexadecyl)zinc, di(phenyltetradecyl)zinc, di(2-[2,3,5-tributylphenyl]ethyl)zinc, dibenzylzinc, di(4,6-dicyclopentyldecyl)zinc, and the like. Also suitable are mixed alkylzincs such as methylethylzinc, ethylisopropylzinc, n-propyl-n-hexylzinc, etc. Generally, on account of their availability, the dialkylzincs are used. However, it is also within the scope of the invention to utilize methylzinc hydride, ethylzinc hydride, n-butylzinc hydride, phenylzinc hydride, cyclohexylzinc hydride, 2-methylcyclopentylzinc hydride, 3-butylphenylzinc hydride, 8-phenyloctylzinc hydride, 10-phenyltetradecylzinc hydride, and the like. Mixtures of the organozinc compounds can be used.

Boron compounds which can be used in accordance with this invention are tetraborane, pentaborane, hexaborane, decaborane, diborane, trimethylboron, triethylboron, tri-n-propylboron, triisopropylboron, tri-n-butylboron, triisobutylboron, tri-n-amylboron, the triisoamylboron, tri-n-hexylboron, tri-n-octylboron, and tri-n-dodecylboron. Also useful in accordance with this invention are tricyclopentylboron, tricyclohexylboron, trimethylcyclopentylboron, trimethylcyclohexylboron, triphenylboron, the tritolylborons, tri(2-hexyltetradecyl)boron, tri(4-cyclohexyloctyl)boron, tri(2-butylcyclohexyl)boron, tri(2,4,8 - trimethylhexadecyl)boron, tri(phenyltetradecyl)boron, tri(2-[2,3,5-tributylphenyl]ethyl)boron, tribenzylboron, and the like. Also suitable are mixed alkylborons such as methyldiethylboron, diethylisopropylboron, n-propyldi-n-hexylboron, etc. Generally, on account of their availability, the trialkylborons are used. However, it is also within the scope of the invention to utilize dimethylboron hydride, methylboron dihydride, methylethylboron hydride, diethylboron hydride, ethylboron dihydride, di-n-butylboron hydride, methyl-n-hexylboron hydride, diphenylboron hydride, phenylboron dihydride, cyclohexylboron dihydride, di-2-methylcyclopentylboron hydride, 3-butylphenylboron dihydride, 8-phenyloctylboron dihydride, and 10-phenyltetradecylboron hydride, and the like. Mixtures of the boron compounds can be used.

It is also within the scope of our invention to utilize a chromium oxide catalyst, the support (silica, silica-alumina, alumina, etc.) of which has been heated with fluorides such as hydrogen fluoride, hydrated aluminum fluoride, or ammonium fluosilicate to increase the polymerization activity.

Our invention includes not only the production of homopolymers of ethylene but also the copolymerization of ethylene with minor proportions of higher olefins such as propylene, 1-butene, 2-butene, isobutylene, 1-pentene, 1-hexene, 4-methyl-1-pentene, 1-octene, 1-decene, and 1-dodecene. In general, the comonomer can be any aliphatic monoolefin having from 3 to 12 carbon atoms per molecule. Generally, the amount of higher olefin comonomer used is within the range of 1 to 25 weight percent based on comonomer plus ethylene. More frequently, the amount of comonomer is within the range 2 to 15 weight percent based on total olefins. Usually, the preferred olefinic comonomer is a 1-olefin on account of the higher reactivity of these olefins.

The reaction in accordance with this invention is generally carried out, as previously indicated, within the temperature range 100 to 500° F. Most frequently, the range is from 150 to 350° F. since polymer yields are highest within this range.

The polymerization can be conducted in the gaseous or in the liquid phase. It is often desirable to have present a diluent hydrocarbon, usually one which is liquid under the reaction conditions and inert and nondeleterious toward the catalyst. Suitable diluents are hydrocarbons having from 3 to 12 carbon atoms per molecule. On account of their inertness, these are generally selected from the group paraffins, cycloparaffins, and aromatics. The aromatics are less preferred than the other two series of hydrocarbons because they, or impurities often accompanying them, appear to decrease the activity of the catalyst. Preferred diluents include propane, n-butane, isobutane, n-pentane, isopentane, n-hexane, n-heptane, 2,2,4-trimethylpentane, cyclopentane, cyclohexane, methylcyclohexane, n-dodecane and mixtures thereof.

The polymerization reaction can be conducted with the olefin or olefins in the gaseous phase. However, it is often preferred to have one of the aforementioned liquid diluents present in the liquid phase because the removal of exothermic heat of reaction is thus facilitated. The pressure is generally in the range 0 to 2000 p.s.i.g. and need be no more than sufficient to maintain the diluent in liquid phase, i.e., 50 to 750 p.s.i.g.

When the reaction temperature is less than about 225° F., the polymer may form as a suspension in the reaction mixture. At higher temperatures the polymer, in most cases, forms in solution in the diluent in the reaction zone.

The contacting of monomers with catalyst can be effected by any of the techniques known in the art of solid catalysis. A highly convenient method of operation is to suspend the oxide catalyst in the liquid diluent and to agitate the reaction mixture, thus maintaining the catalyst as a solid suspension in the liquid diluent. Other known catalytic contacting techniques are operative, e.g., fixed bed, fluidized bed, gravitating bed, etc.

The organozinc and organoboron compounds are preferably supplied to the reaction as streams separate from the oxide catalyst. Also, they can be completely added at the beginning of the reaction or added continuously as the polymerization proceeds. They can be premixed with the chromium oxide catalyst but, in such a case, it is preferred that they not be allowed to remain in contact with the chromium oxide catalyst in the absence of unreacted monomer for more than a few minutes. Contact of the zinc or boron compound with the chromium oxide catalyst for extended periods of time, in the absence of reacting monomers, appears to result in a decrease in the activity of the catalyst.

It is generally desirable that the reagents and the diluent be substantially anhydrous and free from catalyst poisons such as sulfur compounds, carbon monoxide, and oxygen. Many halogen compounds are catalyst poisons. When small amounts of moisture or other catalyst poisons are not removed prior to the polymerization reaction, the amount of organozinc compound used should be increased to take into account the amount of such compound decomposed by impurities such as water and to provide a sufficient amount to enhance the activity of the chromium oxide catalyst after any moisture or other impurity present has completely reacted with the added amount of organozinc compound.

Example I

In a series of runs, ethylene was polymerized to solid homopolymer by contacting with a chromium oxide-silicaalumina catalyst containing 1.3 weight percent chromium trioxide that was activated in dry air for 5 hours at 1000° F. The silica-alumina was a microspheroidal material containing 0.1 weight percent alumina. The runs were made in a 1400 ml. stirred reactor using the following technique: The reactor was warmed and flushed with dry nitrogen, and the chromium oxide-containing catalyst suspended in 435 ml. of cyclohexane was charged. The reactor was heated to the indicated reaction temperature and ethylene was added as used to maintain a reaction pressure of 450 p.s.i.g. during a one-hour reaction period. When an organometal compound was used, a dilute solution of the compound in cyclohexane was added during the run so that the concentration of organometal compound was at the indicated level at the end of the run. When a mixture of organometal compounds was used, the procedure was the same except that the cyclohexane solution contained both organometal compounds in the proper ratio to give the indicated concentrations at the end of the run.

| Organometal Compound | | Reaction Temp., °F. | Polymer Yield, g./g. of $CrO_3$-$SiO_2$-$Al_2O_3$ | Melt Index a | Shear Response HLMI/ MI b |
|---|---|---|---|---|---|
| Type | Weight percent of Cat. | | | | |
| None | | 304 | 1,080 | 0.47 | 66 |
| TEB c | 1.0 | 299 | 1,380 | 0.50 | 76 |
| DEZ d | 4.0 | 314 | 1,110 | 0.49 | 75 |
| TEB | 1.0 } | 300 | 2,140 | 0.54 | 75 |
| DEZ | 4.0 } | | | | | a ASTM D1238-57T, Condition E.
b ASTM D1238-57T, Condition F.
c Triethylboron.
d Diethylzinc.

It is apparent that under conditions designed to give a polymer melt index (MI) of about 0.5, use of either organocompound or both organocompounds results in an increase in shear response, as measured by the ratio of high-load melt index (HLMI) to melt index, from 66 to about 75. However, the increase in yield obtained when both organocompounds are used is more than three times the sum of the yield increases obtained with the individual compounds:

Organometal compound: Yield increase, g.
  TEB ------------------------------- 300
  DEZ ------------------------------- 30
  TEB+DEZ (330 expected) ----------- 1060

Example II

Ethylene was polymerized to solid polymer at improved yields under conditions similar to those of Example I except that the concentration of TEB was 0.17 weight percent based on the weight of the chromium oxide-silica-alumina catalyst and the concentration of DEZ was 0.33 weight percent based on the weight of the chromium oxide-silica-alumina catalyst.

As many possible embodiments can be made of this invention without departing from the scope thereof, it is to be understood that all matter herein set forth is to be understood that all matter herein set forth is to be interpreted as illustrative and not as unduly limiting the invention.

What is claimed is:

1. A process which comprises polymerizing ethylene to normally solid polymer in the presence of a catalyst which forms on mixing (1) chromium oxide, having at least part of the chromium in the hexavalent state at the initial contacting of monomer therewith, and at least one oxide selected from the group consisting of silica, alumina, zirconia, and thoria, (2) a first compound of the formula $ZnR_2$ where R is selected from the group consisting of hydrogen, alkyl, cycloalkyl, and aryl radicals having up to 20 carbon atoms, at least one R being a hydrocarbon radical, the amount of said first compound being in the range of 0.1 to 15 weight percent based upon the weight of component (1), and (3) a second compound selected from the group consisting of boranes of 2 to 10 boron atoms and compounds of the formula $BR_3$ where R is as defined above, the amount of said second compound being in the range of 0.05 to 5 weight percent based upon the weight of component (1).

2. A process according to claim 1 wherein said polymerization is conducted in a hydrocarbon medium.

3. A process according to claim 1 wherein the amount of said first compound is within the range of 2 to 15 weight percent based on the weight of component (1) and wherein the amount of said second compound is within the range of 0.5 to 5 weight percent based on the weight of component (1).

4. A process according to claim 1 wherein said polymerization is conducted in a saturated hydrocarbon medium, wherein said solid polymer is selected from the group consisting of homopolymer of ethylene and copolymer of ethylene with at least one aliphatic olefinic hydrocarbon having from 3 to 12 carbon atoms per molecule, wherein said first compound is a dialkylzinc, and wherein said second compound is a trialkylboron.

5. A process according to claim 4 wherein said saturated hydrocarbon is cyclohexane, said dialkylzinc is diethylzinc, and wherein said trialkylboron is triethylboron.

6. A process according to claim 5 wherein the amount of said first compound is within the range of 2 to 15 weight percent based on the weight of component (1) and wherein the amount of said second compound is within the range of 0.5 to 5 weight percent based on the weight of component (1).

7. The catalyst which forms on mixing (1) chromium oxide, having at least part of the chromium in the hexavalent state, and at least one oxide selected from the group consisting of silica, alumina, zirconia, and thoria, (2) a first compound of the formula $ZnR_2$ where R is selected from the group consisting of hydrogen, alkyl, cycloalkyl, and aryl radicals having up to 20 carbon atoms, at least one R being a hydrocarbon radical, the amount of said first compound being in the range of 0.1 to 15 weight percent based upon the weight of component (1), and (3) a second compound selected from the group consisting of boranes of 2 to 10 boron atoms and a compound of the formula $BR_3$ where R is as defined above, the amount of said second compound being in the range of 0.05 to 5 weight percent based upon the weight of component (1).

8. A catalyst according to claim 7 wherein the amount of said first compound is within the range of 2 to 15 weight percent based on the weight of component (1) and wherein the amount of said second compound is within the range of 0.5 to 5 weight percent based on the weight of component (1).

9. The catalyst according to claim 7 wherein said first compound is a dialkylzinc and wherein said second compound is trialkylboron.

10. The catalyst according to claim 9 wherein said dialkylzinc is diethylzinc and wherein said trialkylboron is triethylboron.

11. A catalyst according to claim 10 wherein the amount of said first compound is within the range of 2 to 15 weight percent based on the weight of component (1) and wherein the amount of said second compound is within the range of 0.5 to 5 weight percent based on the weight of component (1).

References Cited

UNITED STATES PATENTS 2,898,326  8/1959  Peters et al.
3,354,235  11/1967  Hogan et al. ____ 252—430 XR PATRICK P. GARVIN, Primary Examiner U.S. Cl. X.R.

252—430; 260—94.9